(12) United States Patent
Spreij

(10) Patent No.: US 12,204,448 B2
(45) Date of Patent: Jan. 21, 2025

(54) PROCESSING WORK ITEMS IN PROCESSING LOGIC

(71) Applicant: Imagination Technologies Limited, Kings Langley (GB)

(72) Inventor: Tijmen Spreij, London (GB)

(73) Assignee: Imagination Technologies Limited, Kings Langley (GB)

( * ) Notice: Subject to any disclaimer, the term of this patent is extended or adjusted under 35 U.S.C. 154(b) by 35 days.

(21) Appl. No.: 18/083,735

(22) Filed: Dec. 19, 2022

(65) Prior Publication Data

US 2023/0229592 A1 Jul. 20, 2023

(30) Foreign Application Priority Data

Dec. 17, 2021 (GB) ..................................... 2118450

(51) Int. Cl.
*G06F 12/06* (2006.01)
*G06T 15/00* (2011.01)
*G06T 15/06* (2011.01)

(52) U.S. Cl.
CPC ........ *G06F 12/0646* (2013.01); *G06T 15/005* (2013.01); *G06T 15/06* (2013.01); *G06F 2212/1016* (2013.01); *G06T 2210/52* (2013.01)

(58) Field of Classification Search
CPC ......... G06F 12/0646; G06F 2212/1016; G06F 9/30101; G06F 9/3834; G06F 9/3826; G06F 9/30; G06F 9/38; G06T 15/005; G06T 15/06; G06T 2210/52; G06T 1/20; G06T 1/60
USPC ....................................................... 711/104
See application file for complete search history.

(56) References Cited

U.S. PATENT DOCUMENTS

| 10,812,332 B2 * | 10/2020 | Desai ................. H04L 43/0894 |
| 2009/0037694 A1 | 2/2009 | Luick et al. |
| 2009/0210679 A1 | 8/2009 | Tsai et al. |
| 2021/0109760 A1 * | 4/2021 | Muller ................ G06F 9/30145 |

OTHER PUBLICATIONS

Anonymous: "ASIC Design Flow—an Overview", May 7, 2020 (May 7, 2020), Retrieved from the Internet: URL:https://teamvlsi.com/2020/05/asic-design-flow-overview-vl.html [retrieved on Nov. 28, 2023].

* cited by examiner

*Primary Examiner* — Hua J Song
(74) *Attorney, Agent, or Firm* — Potomac Law Group, PLLC; Vincent M DeLuca

(57) ABSTRACT

A plurality of work items are processed through a processing pipeline comprising a plurality of stages in processing logic. The processing of a work item includes: (i) reading data in accordance with a memory address associated with the work item, (ii) updating the read data, and (iii) writing the updated data in accordance with the memory address associated with the work item. The method includes processing a first work item and a second work item through the processing pipeline, wherein the processing of the first work item through the pipeline is initiated earlier than the processing of the second work item, and where it is determined that the first and second work items are associated with the same memory address, first updated data of the first work item is written to a register in the processing logic, and the processing of the second work item comprises reading the first updated data from the register instead of reading data from the memory.

20 Claims, 8 Drawing Sheets

PROCESSING WORK ITEMS IN PROCESSING LOGIC

BACKGROUND

Computing systems, such as ray tracing systems, typically comprise a memory, such as a random-access memory (RAM), and processing logic. The processing logic can be used to process work items. For example, the work items may be processed through a processing pipeline comprising a plurality of stages in the processing logic, wherein at a given time different work items may be at different stages of the pipeline. In this way, operations can be performed on those work items systematically as they move through that pipeline. For example, there may be three stages in the pipeline for processing a work item using a memory, and each stage may be executed over a respective clock cycle. A first operation in the pipeline may comprise reading existing data from the RAM at an address that is associated with that work item. A second operation in the pipeline may comprise processing the read data to generate updated data using the data carried by the work item. Subsequently, a third operation in the pipeline may comprise writing the updated data back to the RAM at the same address as that from which the existing data was read. The processing pipeline is typically executed over a number of clock cycles. There is not necessarily a one to one relationship between the stages (or clock cycles) and the operations in the pipeline. As an example, it may take two clock cycles (corresponding to the first and second stages) to perform the read operation (i.e. the first operation in the pipeline) and an additional one clock cycle (corresponding to the third stage) to process the read data to generate updated data and perform the write operation (i.e. the second and third operations in the pipeline).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of processing a plurality of work items in processing logic of a computing system, wherein the computing system comprises a memory, and wherein each of the work items is associated with a memory address in the memory. The plurality of work items are processed through a processing pipeline comprising a plurality of stages in the processing logic, wherein at a given time different work items are at different stages of the pipeline. The processing of a work item comprises: (i) reading data in accordance with the memory address associated with the work item, (ii) updating the read data, and (iii) writing the updated data in accordance with the memory address associated with the work item. The method comprises: processing a first work item and a second work item through the processing pipeline, wherein the processing of the first work item through the pipeline is initiated earlier than the processing of the second work item; and determining that the first and second work items are associated with the same memory address. The processing of the first work item comprises writing first updated data to a register in the processing logic. The processing of the second work item comprises reading the first updated data from the register instead of reading data from the memory.

The work items to be processed may be rays that are used to perform ray tracing.

The memory may be a random-access memory (RAM).

The processing pipeline may comprise three stages, wherein each of the stages is executed over a respective clock cycle.

The processing of the second work item may further comprise writing second updated data to the register.

The processing of the second work item, including the reading of the first updated data from the register and the writing of the second updated data to the register, may be executed over a single clock cycle.

The method may further comprise processing a third work item associated with the same memory address as the first and second work items, the processing of the third work item through the pipeline being initiated later than the processing of the second work item, wherein processing the third work item comprises reading the second updated data from the register instead of reading data from the memory and writing third updated data to the register instead of writing data to the memory.

The processing of the third work item may be initiated after it has been determined that the register has stored data associated with the same memory address as the third work item.

The method may further comprise writing the data stored in the register to the memory.

The data stored in the register may be written to a line of the memory at the memory address with which the first and second work items are associated.

The data stored in the register may be written to the memory in response to determining that the processing of another work item, which is associated with a different memory address to the memory address with which the first and second work items are associated, is to write data to the register.

The method may further comprise overwriting the register with updated data from the processing of said another work item.

The register may be a first register, and the method may further comprise: processing a first further work item and a second further work item through the processing pipeline, wherein the processing of the first further work item through the pipeline is initiated earlier than the processing of the second further work item; and determining that the first further work item and the second further work item are associated with the same memory address, that memory address being different from the memory address with which the first and second work items are associated; wherein the processing of the first further work item comprises writing first further updated data to a second register in the processing logic; and wherein the processing of the second further work item comprises reading the first further updated data from the second register instead of reading data from the memory.

The method may further comprise storing indications of the memory addresses associated with the work items that are currently in the processing pipeline, wherein the determination that the first and second work items are associated with the same memory address is made by comparing the stored indications of the memory addresses.

There is also provided a computing system comprising: a memory; and processing logic for processing a plurality of work items through a processing pipeline comprising a plurality of stages, wherein the processing of a work item comprises: (i) reading data in accordance with a memory address associated with the work item, (ii) updating the read data, and (iii) writing the updated data in accordance with the memory address associated with the work item, the processing logic being configured to: process a first work item and a second work item through the processing pipeline, wherein the processing of the first work item through the pipeline is initiated earlier than the processing of the second work item; and determine that the first and second work items are associated with the same memory address; wherein the processing of the first work item comprises writing first updated data to a register in the processing logic; and wherein the processing of the second work item comprises reading the first updated data from the register instead of reading data from the memory.

The computing system may be a ray tracing system.

The register may be the same width as a line of the memory.

The width of the register may be the width of four work items.

The register may be a first register, and the processing logic may further comprise a second register.

The processing logic may be further configured to: process a first further work item and a second further work item through the processing pipeline, wherein the processing of the first further work item through the pipeline is initiated earlier than the processing of the second further work item; and determine that the first further work item and the second further work item are associated with the same memory address, that memory address being different from the memory address with which the first and second work items are associated; wherein the processing of the first further work item comprises writing first further updated data to the second register in the processing logic; and wherein the processing of the second further work item comprises reading the first further updated data from the second register instead of reading data from the memory.

The computing system may further comprise stage registers configured to store indications of the memory addresses associated with work items that are in the processing pipeline, wherein the processing logic is configured to determine that the first and second work items are associated with the same memory address by comparing the stored indications of the memory addresses in the stage registers.

The computing system may be embodied in hardware on an integrated circuit. There may be provided a method of manufacturing, at an integrated circuit manufacturing system, a computing system. There may be provided an integrated circuit definition dataset that, when processed in an integrated circuit manufacturing system, configures the system to manufacture a computing system.

There may be provided a non-transitory computer readable storage medium having stored thereon a computer readable description of a computer system that, when processed in an integrated circuit manufacturing system, causes the integrated circuit manufacturing system to manufacture an integrated circuit embodying a computing system.

There may be provided an integrated circuit manufacturing system comprising: a non-transitory computer readable storage medium having stored thereon a computer readable description of the computing system; a layout processing system configured to process the computer readable description so as to generate a circuit layout description of an integrated circuit embodying the computing system; and an integrated circuit generation system configured to manufacture the computing system according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
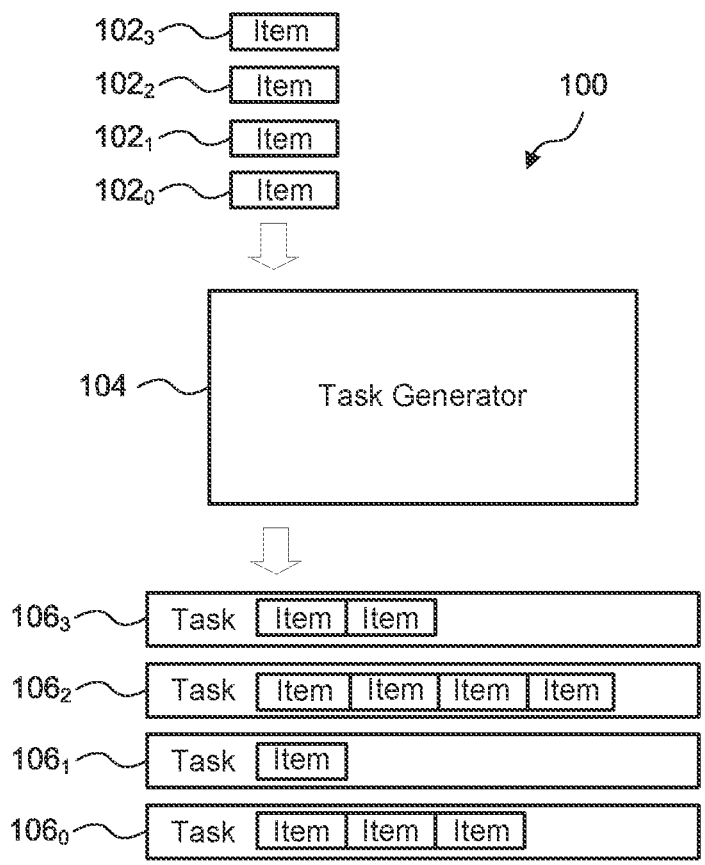
FIG. 1 shows a computing system that is configured to group work items into tasks.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only. An example of a computing system 100 that processes work items in processing logic is illustrated in FIG. 1. The computing system 100 comprises a task generator 104 that receives a stream of work items $102_0$, $102_1$, $102_2$ $102_3$ at its input, and assembles those work items into a plurality of tasks. The work items may be loaded into a pipeline so that they can be systematically provided to and processed by the task generator 104. In FIG. 1, a work item $102_0$ is the first work item in the pipeline and therefore the first to be processed by the task generator 104. Subsequently, work item $102_1$ has been loaded into the pipeline and is therefore the second work item to be processed by the task generator 104. The first and second work items are followed by a third item $102_2$ and then a fourth item $102_3$. Four work items are illustrated in the exemplary pipeline of FIG. 1, however it is appreciated that in alternative examples the pipeline may comprise more or less than four work items. As an example, the computing system may be a ray tracing system and the work items may be rays that are added to tasks in a process which may be referred to as "coherency gathering". In this example, rays are grouped into tasks so that the tasks can be efficiently executed for all of the rays in a task. For example, rays may be grouped into a task if those rays are to be tested for intersection with the same piece of geometry in a scene being rendered or with the same node of an acceleration structure.

At the output of the task generator 104, previous work items to enter the pipeline have been assembled into tasks $106_0$, $106_1$, $106_2$, $106_3$. The job of the task generator 104 is to assemble the work items into the tasks. Each task may comprise up to a maximum permitted number of work items. In the simplified example illustrated in FIG. 1, each task comprises up to four work items. This is demonstrated by task $106_2$, which is made up of four work items. A task may have less than the maximum permitted number of work items. For example, task $106_1$ comprises only one work item, which is lower than the maximum permitted number of four work items. Similarly, task $106_3$ comprises two work items, and task $106_0$ comprises three work items. In alternative examples, the maximum number of work items in a task may be less than or greater than four work items. For example, the maximum number of work items could be much more than four, e.g. it could be 128.

Figure 2:
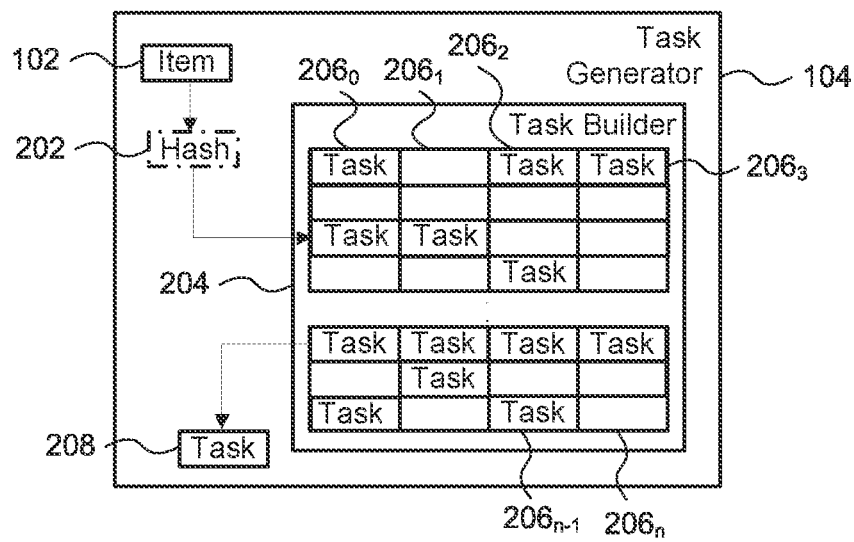
FIG. 2 shows the layout of a task generator that may be implemented within the computing system illustrated in FIG. 1.

A more detailed arrangement of the task generator 104 illustrated in FIG. 1 is shown in FIG. 2. The task generator comprises a task builder 204, which in turn comprises a plurality of slots $206_0$-$206_n$. Each slot of the task builder is configured to store data associated with a task whilst that task is being assembled. At any given point in time, the task builder may comprise some slots that are empty, and some that are storing data associated with a respective task. In FIG. 2, each of exemplary slots $206_0$, $206_2$, $206_3$ and $206_{n-1}$ comprise data associated with a respective task. By comparison, exemplary slots $206_1$ and $206_n$ are empty. Each slot $206_0$-$206_n$ in the task builder is configured to temporarily store data relating to a task. More specifically, data relating to a task is stored in a respective slot in the task builder until that task is evicted from the task builder 204 for processing. An illustration of a task being evicted from the task builder is demonstrated by reference numeral 208.

An incoming work item 102 that is provided to the task generator 104 has a hash function 202 applied to it by processing logic at a processing step before it is provided to the task builder 204. The hash function 202 may be used to covert data associated with the work item into a form that allows the task builder to determine the task to which data from that work item should be added. More specifically, the hash function 202 is used to map data associated with the work item onto a line in the task builder. The processing logic then examines the existing tasks in the slots of that line to determine if the work item can be added to one of those tasks. If a work item can't be added to an existing task, then it is used to create a new task in an empty slot in the line. If there is no empty slot in the line, then an existing task in the line is evicted and a new task is created in its place. This may be referred to as "cache collision".

In an example where the computing system of FIGS. 1 and 2 is an image rendering system (e.g. a ray tracing system), the hash function may be applied to shader type information associated with the incoming work item 102. Once the hash function has been applied to the incoming work item 102, it is determined whether there is an existing task stored in one of the slots $206_0$-$206_n$ in a mapped line of the task builder to which that work item should be added. If there is an existing task to which the work item should be added, then the work item is added to that task. If there is no existing task to which the work item should be added, then the work item may be used to form a new task in one of the empty slots (e.g., $206_1$, $206_n$) of the task builder in the line to which it has been mapped. This method can group work items (e.g. rays in a ray tracing system) into a task if those work items are associated with the same shader, such that when the task is subsequently processed all of the work items in the tasks use the same shader.

There may be two mechanisms for evicting a task from the task builder 204. The first mechanism is referred to as cache collision eviction, which has been mentioned above. This mechanism is activated when all of the slots in a line to which a work item has been mapped are occupied by existing tasks. If a new work item that is mapped onto that line that can't be added to any of the existing tasks, then one of the existing tasks must be evicted to make room for a new task to which the work item can be added. The task to be evicted from the task builder may be the least recently used task in the line. The least recently used task is the task that has been least recently updated with data from a work item in a given line. In alternative examples, a different task to be evicted may be selected in dependence on a different criterion. The second mechanism is used when there has not been a cache collision eviction in the task builder for a predetermined number of clock cycles. This second mechanism may be implemented in scenarios where the first mechanism cannot be relied on to evict all of the necessary tasks from the task builder. The second mechanism comprises a walking evictor that is configured to select one line in the task builder to search for tasks to evict. If the walking evictor does not identify a task to evict in that line, it proceeds to the next line of the task builder on the following clock cycle, and so on until it identifies a suitable task to evict. Once a suitable task is identified, it is evicted from the task builder by the walking evictor. After a task has been evicted, the walking evictor goes back to waiting a preconfigured number of clock cycles before performing a search for its next eviction. The selection of a task to evict by the walking evictor may be dependent on one or more factors. Examples of a task that may be evicted by the walking evictor are the task that was least recently updated and/or the task with the lowest defined priority. The walking evictor may be activated before all of the slots of the task builder have been occupied. The walking evictor may be activated at any point after a first work item has been added to the task builder. The walking evictor may be delayed before becoming active. This delay may be configured in firmware, and may be dependent on the specific application of the system.

Figure 3:
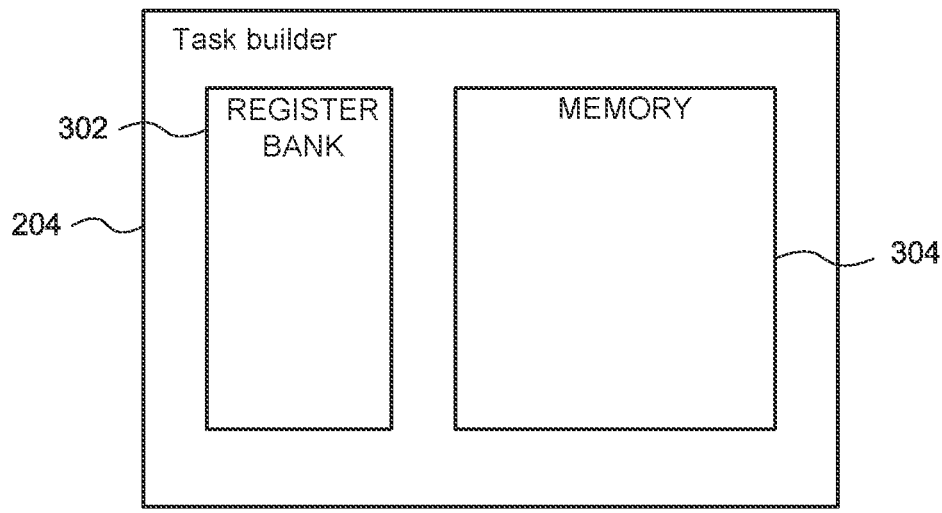
FIG. 3 shows the layout of a task builder that is comprised within the task generator illustrated in FIGS. 1 and 2.

FIG. 3 shows the layout of a task builder 204 that is comprised within the task generator illustrated in FIGS. 1 and 2. The task builder 204 can be further separated into a bank of registers 302 and a memory 304. The memory 304 comprises a plurality of individual lines, which are addressable by respective memory addresses. Data can be stored at each line and can be accessed from the memory using the memory address of the line at which it is stored. Each line of the memory 304 may be configured to store data for a plurality of work items. Thus, the lines of the memory 304 illustrated in FIG. 3 may correspond to the slots $206_0$-$206_n$ comprised within the task builder in FIG. 2. Each line in the memory 304 may be configured to store data for one or more tasks. Each task may comprise a maximum permitted number of work items. Thus, each line the memory 304 may have a width that is equal to the width required to store data for the number of work items of all the tasks stored in the line. Each line in the memory may be split into a plurality of slots. In an example, the number of slots in each line of the memory is four (i.e. each line can store 4 tasks). Each slot may store the data of all the work items for a corresponding task. However, the memory may not be constrained in terms of the number of work items. Instead, each slot in the memory may be configured to store information that is common to all of the work items in a task, the first work item of the task and the last work item of the task. Where the work items are rays, each task may store shader information, the identifier of the first ray in the task and the identifier of the last ray in the task. The separation of each line in the memory into a plurality of slots means that each of the slots in a line can be read at the same time using a single memory address. This increases the efficiency of processing. The memory 304 may be a random-access memory (RAM). A RAM is a form of computer memory in which memory addresses within the RAM can be read from, and/or written to, in any order. RAMs are commonly used in modern computing systems due to the decreased latencies and increased efficiencies that they offer over other storage mechanisms.

Separately to the memory 304, the bank of registers 302 provides an additional mechanism for storing data in the computing system. The bank of registers 302 is comprised within the task builder but is external to the memory 304. The bank of registers 302 may comprise a plurality of registers. The bank of registers 302 is arranged into as many lines as there are lines in the memory 304. Each line in the bank of registers 302 is smaller than the width of the corresponding line in the memory 304. The information that is stored in a line of the bank of registers 302 is different from the information that is in the corresponding line of the memory 304. More specifically, the bank of registers 302 stores information about the slots in each line of the memory 304 that are active, as well as the priority level of each line and which of the tasks in the slot was least recently updated. Thus, a small amount of task data is stored in the bank of registers 302, with the bulk of task data being stored in the memory 304. The information in the bank of registers and the information in the memory complement each other. The memory 304 has higher latency than the bank of registers 302, but is more area efficient. The task builder 204 can access data stored in the bank of registers 302 with very little latency. For example, the bank of registers 302 may be physically close to the logic that performs the processing of the task builder 204.

A fundamental difference between the memory 304 and the bank of registers 302 is that the memory has multicycle access, whereas the bank of registers have single cycle access. This means that it may take multiple clock cycles to access data that is stored in the memory 304. By comparison, it may take a single clock cycle to access data stored in the bank of registers.

Figure 4:
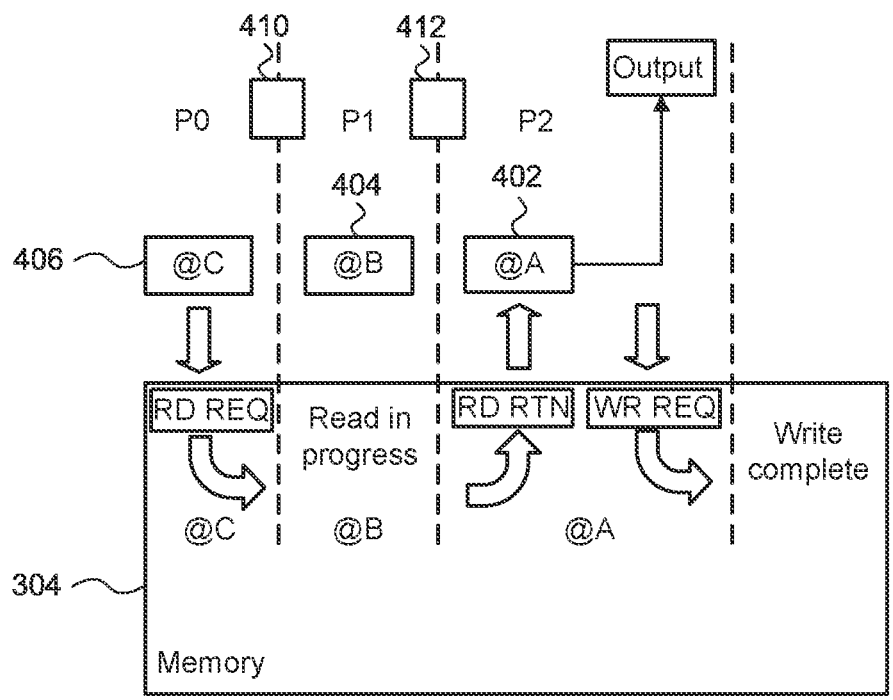
FIG. 4 shows the first step of a method of processing a plurality of work items using an exemplary computing system.
Figure 5:
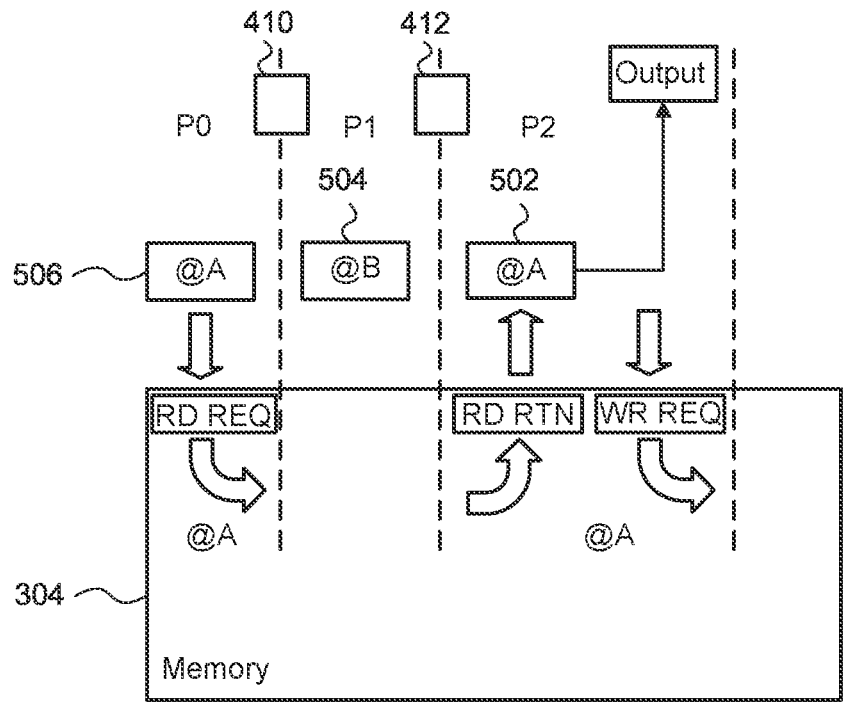
FIG. 5 shows a subsequent step of a method of processing a plurality of work items using the exemplary computing system of FIG. 4.
Figure 6:
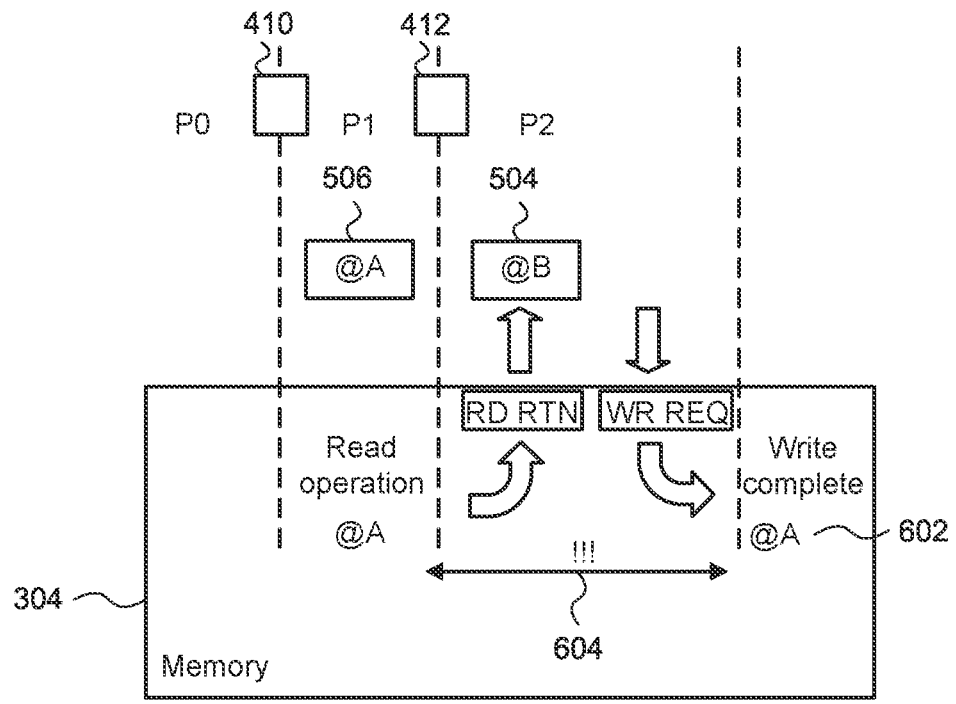
FIG. 6 shows the next consecutive step of a method of processing a plurality of work items using the exemplary computing system of FIG. 5.

An illustration of a method of processing work items (e.g. to add them to tasks which are stored in the memory 304), using the system illustrated in FIGS. 1-3, is shown FIGS. 4-6. The system described with reference to FIGS. 4 to 6 is improved upon by examples described subsequently herein. Incoming work items 402, 404, 406 are processed through a pipeline and are configured to read and write data to and from the memory as they pass through the pipeline. More specifically, work items passing through the pipeline are configured to read data from a specific line in the memory, which may or may not already include data for a task. The work items are then configured to update the data stored at that specific line in the memory with their own data (e.g. to thereby add the work item to a task), to contribute to the building of the task.

In the system illustrated in FIG. 4, the work items are processed through a processing pipeline comprising a plurality of stages P0-P2. In FIG. 4, the processing pipeline comprises three stages. Each stage of the pipeline may be executed over a single clock cycle. So, the total length of the processing pipeline illustrated in FIG. 4 is three clock cycles. In alternative examples, the processing pipeline may be executed over more or less than three stages. For example, the processing pipeline may be executed over two stages, or four stages.

Each work item passes from stage P0 to stage P1 and then to stage P2. In FIG. 4, a first work item 402 has passed through stages P0 and P1 and is now at stage P2; a second work items 404 has passed through stage P0 and is now at stage P1; and a third work item 406 is at stage P0. At stage P0, a work item sends a read request to the memory 304. A read request is a request to access data stored in the memory 304. The read request from a work item is addressed to a specific address of the memory. The specific address of the memory is an address with which the work item is associated. In FIG. 4, the address with which the first work item 402 is associated is address @A, the address with which the second work item 404 is associated is address @B, and the address with which the third work item 406 is associated is address @C. Addresses @A, @B and @C are the identifiers for lines in the memory 304 with which the respective first, second and third work items are associated. In FIG. 4, the third work item 406 is initiating a read from address @C of the memory 304.

The performance of a read operation, as performed on the memory, may be executed over a plurality of clock cycles. In the examples described herein, the performance of a read operation on the memory takes two clock cycles to execute. That is, a read of the memory is initiated at the first stage in the pipeline P0, and subsequently at the second stage in the pipeline P1 the read is still in progress. In FIG. 4, the second work item 404, having sent its read request at stage P0, is waiting at stage P1 to receive the result of that read request from a line of the memory identified by address @B.

At the third stage P2 of the pipeline a work item receives the results of its read request. Following the receipt of the read request results, work items at stage P2 are required to update the read data with the data for that work item, and to write the updated data back to the memory. For example, the work item may be added to a task, and the task (now including the work item) can be written back to the memory. As illustrated in FIG. 4, the steps of receiving the results of a read request, updating the received data and writing the updated data back to the memory may be executed over a single clock cycle. This differs from the process of reading data from the memory, which may be executed over multiple clock cycles. In FIG. 4, the first work item 402 is at the third stage P2 in the pipeline. The first work item 402 is associated with address @A, corresponding to a line identified by address @A in the memory 304. The first work item 402 has already progressed through stages P0 and P1 of the pipeline. Thus, the first work item 402 has already sent a read request to the memory. At stage P2 the first work item 402 has received the results of its read request at address @A and updates that data using its own data. After the data has been updated it will be written back to the memory at address @A. Once stages P0-P2 is complete, the memory 304 should theoretically be provided with the most up-to-date version of data associated with address @A.

The system illustrated in FIG. 4 may comprise a plurality of stage registers 410, 412. The stage registers 410, 412 may be configured to store indications of the memory addresses associated with work items that are in the processing pipeline. The computer system illustrated in FIG. 4 (and also in FIGS. 5 and 6) comprises two stage registers 410, 412. In alternative examples, the computer system may comprise more than two stage registers, such as three stage registers. Each of the plurality of stage registers 410, 412 may be configured to store indications of memory addresses that are associated with the work items that are located at stages in the pipeline at which the stage registers are located.

An event that may occur using the method of processing data illustrated in FIG. 4 is demonstrated in FIGS. 5 and 6. FIG. 5 illustrates a clock cycle of the method illustrated in FIG. 4 wherein three work items 502, 504, 506 are being processed through the pipeline. The work items of note in this figure are a first work item 502 and a third work item 506. The first work item 502 is at stage P2 in the pipeline. Thus, the first work item 502 is in the process of receiving the results of a read request, updating the read data and writing that updated data to the memory. The third work item is at stage P0 in the pipeline. Thus, the third work item 506 is in the process of sending a read request to the memory 304. The processing of the first work item 502 through the pipeline has been initiated earlier than the processing of the third work item 506. Both the first work item 502 and the third work item 506 are associated with the same memory address. That is, the first work item 502 is associated with memory address @A, and the third work item 506 is also associated with the memory address @A. Thus, the first work item 502 is about to write to address @A in the memory, and the third work item 506 is about to read that same address in the memory.

FIG. 6 illustrates a consecutive subsequent clock cycle of the method illustrated in FIG. 5. In FIG. 6, at reference 602, updated data from the first work item 502 has been written to a line in the memory identified by address @A. The third work item 506 is at stage P1 in the pipeline. Thus, a read operation of address @A in the memory is in process, following the read request transmitted by the third work item at stage P0. This means that the read operation being performed by the third work item 506 at address @A will be completed before the first work item 502 has completed its write operation at that address. That is, data from address @A may be provided to the third work item 506 before the first work item 502 has had the opportunity to update that data. Thus, data read by the third work item 506 will be out-of-date, as it does not reflect the updated data written to the memory by the first work item 502. This event may be referred to as a read-after-write (RAW) hazard. The RAW hazard is illustrated in FIG. 6 by reference numeral 604. In FIGS. 5 and 6 a RAW hazard is generated by two work items that are not consecutive, i.e. there is a work item in the pipeline in between the two work items for which there is a RAW hazard. However, this event can also be generated by two work items that are being processed consecutively, i.e. in adjacent clock cycles. That is, in this example, it is the first and third work items which are associated with the same address, but in other examples, it may be the first and second work items (or the second and third work items) which are associated with the same address, and the same issues can occur. In general, RAW hazards can occur between work items which exist concurrently in the pipeline between a read operation and a subsequent write operation to the same memory.

A simple known solution for avoiding RAW hazards is to stall work items at early stages of the pipeline (e.g., at stage P0) so that all write operations in the later stages of the pipeline are completed before early-stage read operations are performed. In the example illustrated in FIG. 5, this simple solution would involve stalling the third work item 506 at stage P0 in the pipeline until the first work item 502 has completed its write operation at stage P2. That is, a read request to be sent by the third work item 506 would be postponed until the first work item 502 had completed writing its updated data to address @A in the memory. Whilst simple, a limitation of this solution is that it introduces latencies into the computing system, which has a negative impact on the performance of the system. Thus, there is a need for an improved method of reading and updating data.

Figure 7:
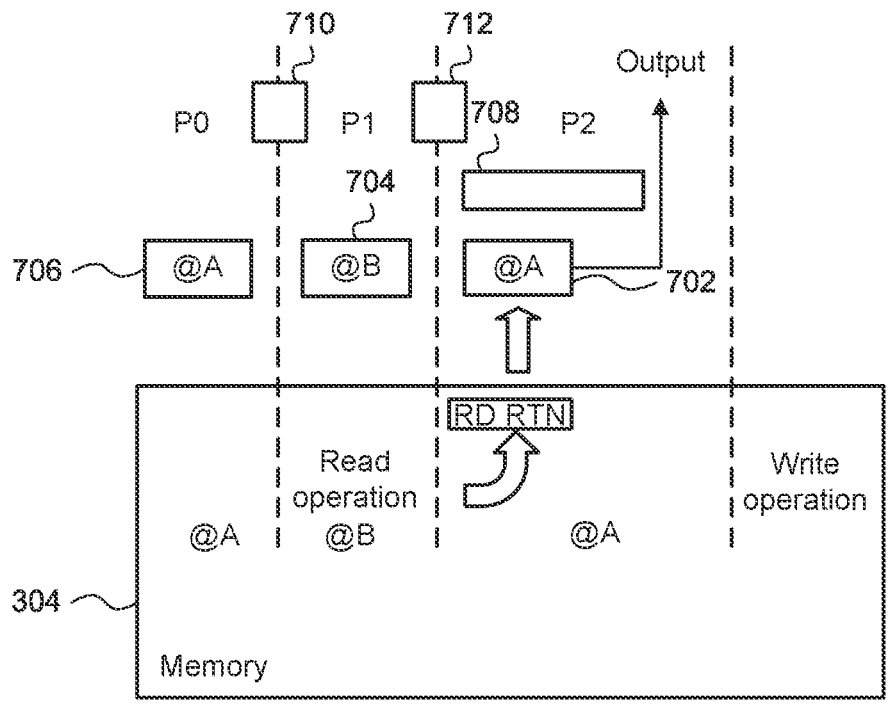
FIG. 7 shows the first step of a method of processing a plurality of work items using an improved computing system.

The first step of a method of processing a plurality of work items using an improved computing system is illustrated in FIG. 7. As with the system illustrated in FIGS. 4-6, the system of FIG. 7 comprises a memory 304. The system further comprises processing logic for processing a plurality of work items through a processing pipeline. In FIG. 7, as with FIGS. 4-6, the pipeline comprises three stages P0, P1 and P2. In alternative examples the pipeline may comprise more or less than these three stages. The first step of processing of work items by the processing pipeline comprises reading data in accordance with a memory address associated with the work item. The second step of processing work items comprises updating the read data. The third step of processing work items by the processing pipeline comprises writing the updated data in accordance with the memory address associated with the work item.

The system illustrated in FIG. 7 further comprises a register 708. The register 708 is external to the memory 304. The register may be located next to the processing logic that is used to process work items in the processing pipeline. Thus, the register may be referred to as a local copy register, and the processing logic can access data from the register 708 with less latency than it can access data from the memory 304. The register 708 is separate to the bank of registers 302 as in FIG. 3. Thus, the system of FIG. 7 may comprise a bank of registers as illustrated by reference numeral 302, in addition to the register 708. The separate bank of registers may be implemented as described as above with respect to FIG. 3. The register is implemented in the processing logic. The register 708 is configured to store information from one or more work items that are processed through the processing pipeline.

As with the system illustrated in FIGS. 4-6, the processing logic of the system in FIG. 7 is configured to process a first work item 702, a second work item 704 and a third work item 706 through the processing pipeline, wherein the first and third work items 702 and 706 are both associated with an address @A. In this example, the second work item 704 is associated with an address @B. In FIG. 7 the first work item 702 is at stage P2 in the pipeline. Thus, the first work item 702 is about to receive the results of a read request, update its read data and write that data to the memory. The second work item 704 is at stage P1 in the pipeline. The third work item 706 is at stage P0 in the pipeline. Thus, the third work item 706 is about to send a read request to the memory 304. Since the first work item 702 is associated with an address @A, the results of the read request received by the first work item 702 are from address @A in the memory, and the write request sent by the first work item 702 is a request to write to a line of the memory identified by address @A. The third work item 706 is also associated with address @A. Thus, the read request sent by the third work item 706 is a request to read data located at a line in the memory that is identified by address @A. In this example, there is a potential RAW hazard between the first and third work items (but in other examples, there may be other potential RAW hazards, e.g. between the first and second work items or between the second and third work items).

The processing logic is configured to determine whether any of the first work item 702, the second work item 704 and the third work item 706 are associated with the same address in the memory 304. Since the first work item 702 and the second work item 704 are associated with different addresses in the memory 304, then there is no RAW hazard between these two work items. Thus, the first work item 702 and the second work item 704 can be processed as normal. That is, the first work item can continue with its intended write of updated data to the memory at the associated address @A, and the second work item 704 can complete the process of reading data from the memory at the associated address @B.

However, as mentioned above, in the example illustrated in FIG. 7, the first and third work items 702, 706 are associated with the same address in the memory (@A), so there is a RAW hazard between these two work items. In this scenario, when the processing logic determines that the first work item 702 and the third work item 706 are associated with the same address in the memory 304, then the third work item 706 is not processed using the memory 304. More specifically, the first work item 702 may read data from address @A of the memory 304 when it is in stage P0, but when it is in stage P2 it writes updated data to the register 708 instead of writing updated data to the memory. In other words, the first work item writes its updated data to the register 708 and not to the memory 304. The register 708 is used as a substitute for the memory 304, whereby the updated data of the first work item is not written from the first work item to the memory 304 at all. That is, once the first work item has written its updated data to the register 708 at stage P2, that updated data is retained in the register 708 and processing of the work item through the pipeline is complete. Furthermore, the read request for the third work item 706 is not issued to the memory 304 in stage P0, so data is not read from the memory for the third work item 706, and instead when the third work item reaches stage P2 of the pipeline it will read data from the register 708 (and not from the memory 304). In other words, instead of the write operation of the first work item and the read operation for the third work item being performed using the memory 304, these operations are performed with using the register 708.

Figure 8:
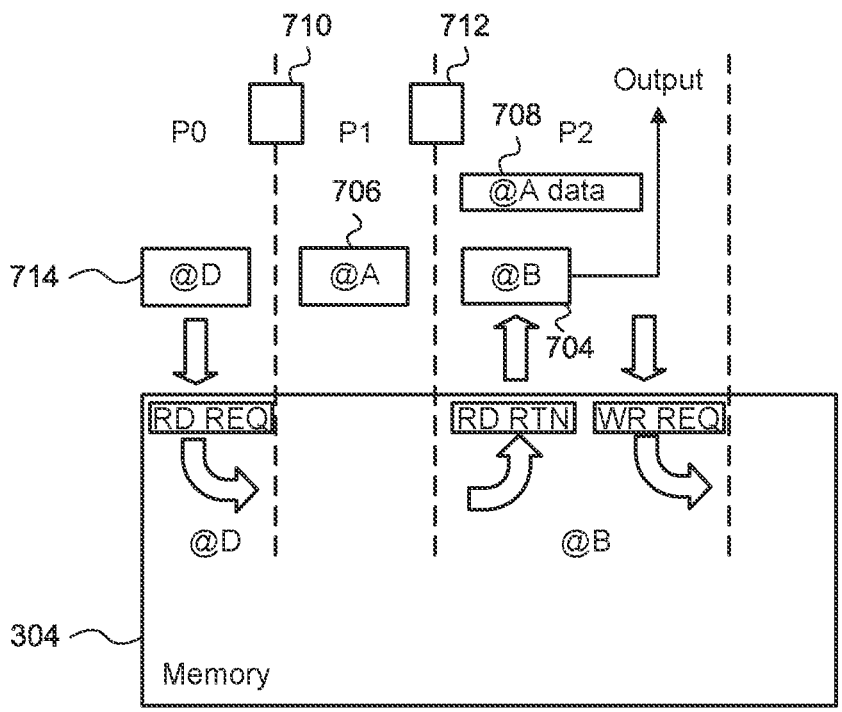
FIG. 8 shows a second step of a method of processing a plurality of work items using the improved computing system of FIG. 7.

FIG. 8 shows a subsequent clock cycle of the processing pipeline illustrated in FIG. 7. In FIG. 8, the first work item 702 has not written its updated data to the memory at address @A. Instead, the first work item 702 has written its updated data to the register 708. This is illustrated in FIG. 8, where the register is illustrated as comprising data associated with address @A which has been written by the first work item 702.

The third work item 706 is at stage P1 in the pipeline, where it is waiting for the completion of a read operation. When the third work item gets to stage P2 in the pipeline, instead of reading data from the memory at address @A, it will read data associated with address @A from the register 708. This is because the third work item 706 has determined that the most up-to-date version of the data associated with address @A is stored in the register instead of in the memory. A new work item, 714, has entered the pipeline at stage P0. The new work item is associated with a different address @D to the address stored in the register 708.

The determination that the first and third work items are associated with the same memory address is performed by the processing logic in FIG. 7. This determination may be performed using a variety of different mechanisms. As with the system illustrated in FIGS. 4-6, the system illustrated in FIG. 7 may comprise a plurality of stage registers 710, 712. The stage registers 710, 712 may be configured to store indications of the memory addresses associated with work items that are in the processing pipeline. The computer system illustrated in FIG. 7 comprises two stage registers 710, 712. In alternative examples, the computer system may comprise more than two stage registers, such as three stage registers. Each of the plurality of stage registers 710, 712 may be configured to store indications of memory addresses that are associated with the work items that are located at stages in the pipeline at which the stage registers are located. A first stage register 710 may be configured to store the memory address to which a read request is targeted by a work item at stage P1 of the pipeline. A second stage register 712 may be configured to store a memory address to which a write request is targeted at stage P2 of the pipeline. The stage registers may be configured to store only the respective memory address targeted by the current work item in the respective processing stage P1, P2. In this example, the address stored by each stage register is overwritten each time a new work item passes through the respective stage in the pipeline.

In the clock cycle illustrated in FIG. 7, the first stage register 710 will store an indication of address @B, as this is the address from which a read has been requested by the second work item 704 which is currently at stage P1 in the pipeline. The second stage register 712 will be storing an indication of address @A, as this is the address associated with the first work item 702 which is currently at the write operation stage P2.

When a new work item, such as third work item 706, enters the pipeline at stage P0, the address associated with this work item is compared by the processing logic to the addresses stored in the first and second stage registers 710, 712. It can then be determined whether the new work item is associated with the same address as one of the other work items in the pipeline. The example in FIG. 7 illustrates first and third work items (that are associated with the same address) being separated by a pipeline stage, or a clock cycle. In alternative examples work items (e.g. the first and second work items) which are processed consecutively, or in adjacent clock cycles, may be associated with the same memory address.

In an alternative example, instead of the stage registers 710, 712 storing addresses requested by work items that have passed through the pipeline, these registers may calculate these addresses by applying the hash function to the shader information which is stored in each of the stage registers.

After the first work item 702 has written its updated data to the register 708, when the third work item 706 gets to stage P2 it performs a read operation of the register. Then the third work item 706 will update the data stored in the register 708 by writing the updated data back to the register. This action is performed on the basis of the processing logic determining that the data associated with address @A is already stored in the register 708, and therefore that there is no need to read that data again from the memory 304. Whilst there is data associated with address @A stored in the register 708, all work items that are subsequently propagated through the pipeline, and that are associated with address @A, will read data from and write data to the register 708 instead of from the memory 304. For each incoming work item, the processing logic is configured to query the register 708 in preference to the memory 304. In this way, the processing logic can determine whether there is data associated with an address in stored in the register before the memory is queried. If there is data associated with an address stored in the register, then read and write operations are performed on the register instead of the memory. This ensures that one of the memory 304 and the register 708 always has the most up-to-date version of data associated with any given address in the memory.

The processing logic implemented by the computing system illustrated in FIGS. 7 and 8 may be further configured to write the data stored in the register 708 back to the memory. That is, at some point the data associated with address @A that is stored in the register 708 in FIG. 8 may be written back to the memory 304 at address @A. This writing of data back to the memory 304 may occur when the register is needed to store data for a new address in the memory. For example, subsequently to the clock cycle illustrated in FIG. 8, further work items may enter the pipeline that are both associated with the same second address in the memory, say address @B. These further work items would generate a RAW hazard if they were to read and write data from the memory 304 instead of from the register 708. Thus, data from such further work items must be replaced with the data associated with the first and second work items. That is, the data stored in the register 708 may be written to the memory in response to the determination that the processing of another work item, which is associated with a different memory address to the memory address with which the first and second work items are associated, needs to write data to the register. The data in the register, which may have previously been associated with address @A, is overwritten with updated data associated with the second address @B.

When the data stored in the register 708 is written back to the memory 304, that data is written to a line in the memory associated with the same address as the data. In the example illustrated in FIGS. 7 and 8, the data that is stored in the register 708 is associated with address @A. Thus, when the data is written back to the memory 304, that data is written to address @A. This ensures that, when the register is no longer in use by data associated with a certain address in the memory, the memory is updated by the data in the register so that most up-to-date version of the data is stored in the memory. Thus, subsequent work items that send a read request to that address in the memory (e.g., @A) will receive the most up-to-date version of data associated with that address.

The register 708 may be the same width as a line of the memory. In other words, the register 708 may be able to store data for the same number of work items as one of the lines of the memory. An advantage of the register 708 being of the same width as a line in of the memory is that the entirety of the contents of the register can be written to the memory when the register is needed to store data associated with a second address in the memory. However, in other examples, instead of being the same width, the register 708 may be smaller in width than a line of the memory. In a further example, the register may be wider than a line of the memory.

Figure 9:
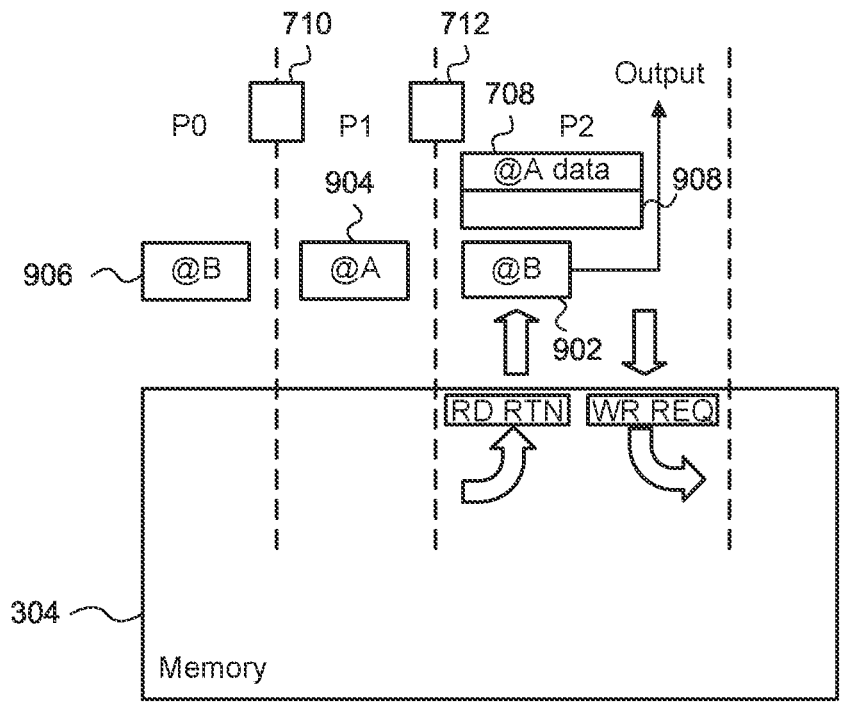
FIG. 9 shows the first step of a method of processing a plurality of work items using an alternative improved system.

The first step of a method of processing a plurality of work items using an alternative improved system is illustrated in FIG. 9. The computing system in FIG. 9 differs from the one illustrated in FIGS. 7 and 8 in that, in addition to comprising a first register 708, it further comprises a second register 908. The second register 908 is also configured to store data associated with a single address line in the memory. As with the first register 708, the second register 908 is implemented in processing logic and is external to the memory 304. The second register 908 may be comprised within the same hardware or software component as the first register 708.

The computing system illustrated in FIG. 9 is at a clock cycle where it has already processed at least a first work item which is associated with address @A, and the first work item has already written its data, associated with address @A, to the first register 708. The computing system is further configured to process at least a first further work item 902, a second further work item 904 and a third further work item 906. The second further work item 904 is associated with address @A which is why the first work item wrote its data into the register 708. In FIG. 9, the first further work item 902 is at stage P2 in the pipeline, the second further work item 904 is at stage P1 in the pipeline, and the third further work item 906 is at stage P0 in the pipeline. Thus, the processing of the first further work item 902 through the pipeline is initiated earlier than the processing of the second and third further work items 904 and 906.

Figure 10:
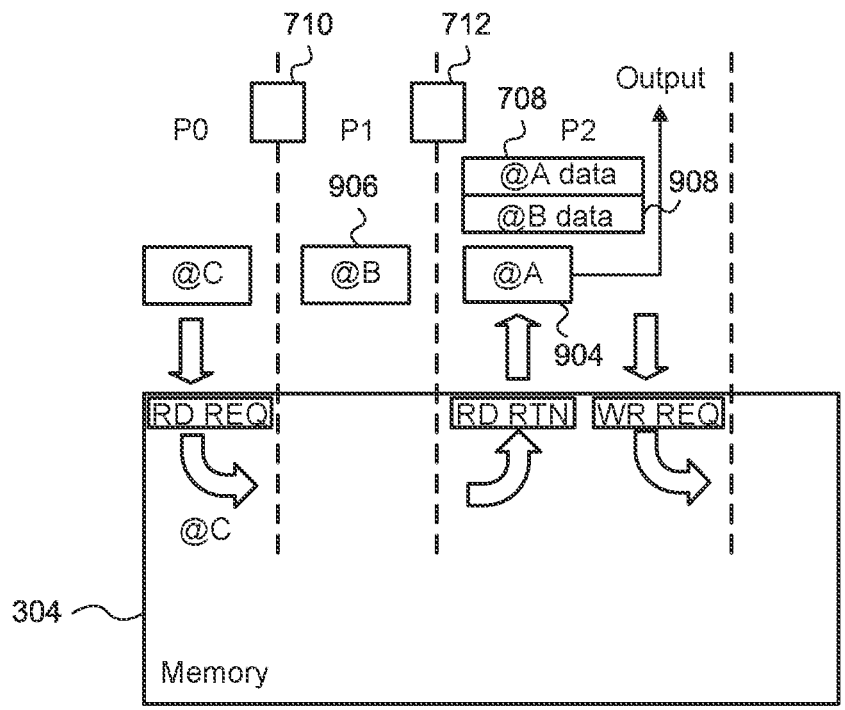
FIG. 10 shows a second step of a method of processing a plurality of work items using the improved computing system of FIG. 9.

The first further work item 902 and the third further work item 906 are each associated with the same address in the memory 304, which is denoted @B in FIGS. 9 and 10.

In FIG. 9, the first register 708 is already storing data associated with an address in the memory @A. As described above with respect to FIG. 7, the processing logic of the computing system is configured to determine whether work items are associated with the same address in the memory 304. Thus, the processing logic is configured to determine whether any of the further first work item 902, the second further work item 904, and the third further work item 906 are associated with the same address in the memory 304 as each other or as any data stored in the registers 708 or 908. As mentioned above, the second further work item 904 is associated with the same address as the data stored in the register 708, so the second further work item 904 is processed as described above with reference to FIGS. 7 and 8 (i.e. when it gets to stage P2 it will read data from the register 708 and write updated data back to the register 708). The first and third further work items 902 and 906 are not associated with the @A address. If the first further work item 902 and the third further work item 906 are associated with different addresses in the memory 304, then there is no RAW hazard for these further work items. Thus, if the processing logic determines that the first further work item 902 and the third further work item 906 are associated with different addresses in the memory 304, then the first further work item 902 and the third further work item 906 can be processed as normal. That is, the first further work item 902 can continue with its intended write of updated data to the memory at its associated address, and the third further work item 906 can complete the process of reading data from its associated address.

However, in the example illustrated in FIG. 9, the first and third further work items 902, 906 are associated with the same address in the memory @B. As described above, if the first and third further work items 902, 906 are associated with the same address in the memory 304, then this is indicative of the imminent occurrence of a RAW hazard. In this scenario, when the processing logic determines that the first further work item 902 and the third further work item 906 are associated with the same address in the memory 304, then the further work items 902, 906 are processed using the second register 908. More specifically, the first further work item 902 will write updated data to the second register 908 (not to the memory) and the third further work item 906 will read data from the second register 908 (not from the memory). The determination that the first and third further work items are associated with the same address may be made by stage registers as described above with respect to FIG. 7.

Once it has been determined that the first further work item 902 and the third further work item 906 are associated with the same memory address, the processing logic is further configured to determine whether data from the first further work item 902 can be written to one of the registers 708, 908. As mentioned above, the first register 708 is already storing data associated with address @A. Furthermore, the second further work item 904, which is associated with address @A, is still being processed in the pipeline in FIG. 9. Thus, the data for address @A cannot be overwritten, so data from the first further work item 902 cannot be written to the first register 708. However, the second register 908 is vacant. Thus, the first further work item 902 is able to write its data to the second register 908.

At a subsequent clock cycle from the one illustrated in FIG. 9, illustrated in FIG. 10, the processing logic has written data from the first further work item 902, associated with address @B, to the second register 908. The second further work item 904 is in stage P2 and it can read data from the first register 708 and write updated data back to the first register 708. The third further work item 906 is now in stage P1, and when it gets to stage P2 it will read the first further updated data from the second register 908 instead of reading data from the memory 304.

Figure 11:
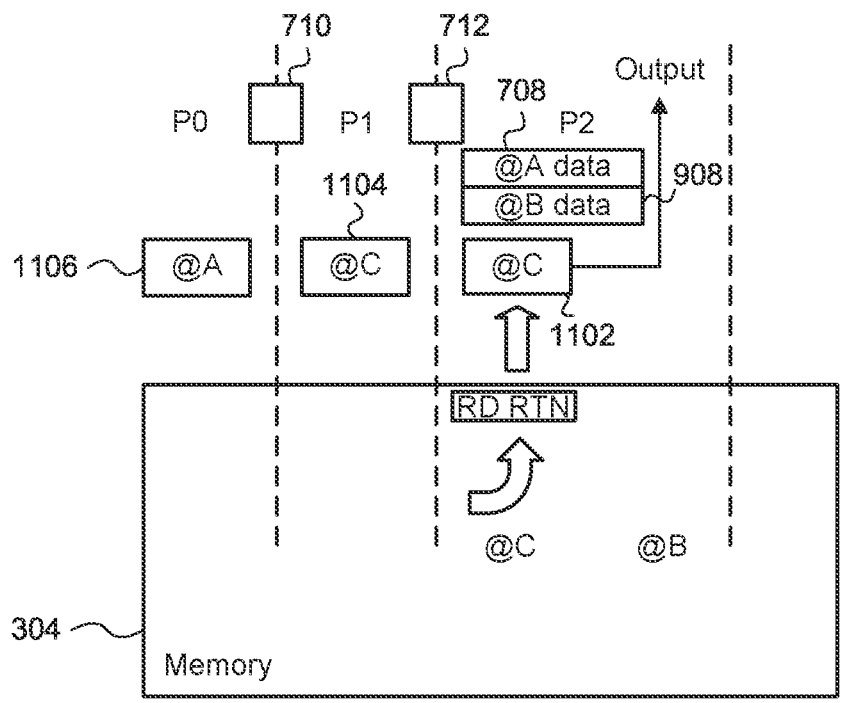
FIG. 11 shows a third step of a method of processing a plurality of work items using the improved computing system of FIGS. 9 and 10.
Figure 12:
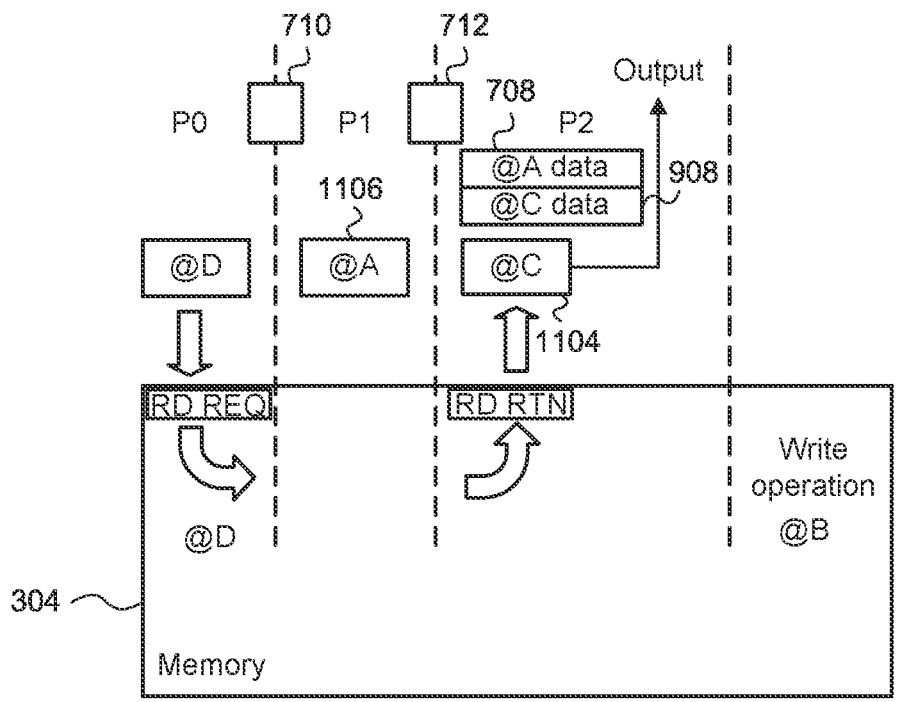
FIG. 12 shows a fourth step of a method of processing a plurality of work items using the improved computing system of FIGS. 9 to 11.

FIGS. 11 and 12 illustrate two subsequent clock cycles of the method illustrated in FIGS. 8 and 9. In FIG. 11, the first register 708 is storing data associated with memory address @A, and second register 908 is storing data associated with address @B. Thus, both registers are storing data associated with a respective memory address. In FIG. 11 two additional work items 1102, 1104 have entered the pipeline. The first of these additional work items 1102 is at stage P2 of the pipeline, and so is about to receive the results of its read request from the memory 304. The second additional work item 1104 is at stage P1 of the pipeline. Both additional work items 1102, 1104 are associated with the same memory address @C. The additional work items 1102, 1104 are also being processed in adjacent clock cycles. Thus, as described in more detail above, the processing logic will determine that work items 1102 and 1104 are associated with the same memory address (e.g., using stage registers 710, 712).

In FIG. 11 there is a third additional work item 1106 being processed in the pipeline. The third additional work item 1106 is associated with address @A in the memory. Data associated with address @A is currently being stored in the first register 708. There is no work item in the pipeline in FIG. 11 that is associated with address @B. The processing logic is configured to compare the memory addresses associated with data stored in the first and second registers to corresponding indications of the memory addresses associated with work items in the pipeline. From this observation, the processing logic will determine whether there is data stored in one of the registers that is needed for processing of one of the work items in the pipeline. In FIG. 11, the processing logic will determine the data stored in the first register 708 is required for the read operation to be performed by the third additional work item 1106. As there is no work item associated with address @B in the pipeline, the register that should be overwritten to store data from the first additional work item 1102 is the second register 908.

FIG. 12 illustrates a subsequent clock cycle to the cycle illustrated in FIG. 11. In this clock cycle, the first additional work item 1102 has written its data to the second register 908. The data associated with address @B which was previously stored in the second register 908 has been written back to the memory 304. The data has been written to a line of the memory associated with (or identified by) address @B. The writing of the data associated with address @B back to the memory, from the second register 908, is initiated in response to the determination that the processing of the first additional work item 1102, which is associated with a different memory address from address @B, is to write data to the register. The data associated with address @B in the second register 908 is overwritten with updated data from the processing of the first additional work item 1102, which is associated with address @C.

The examples illustrated herein demonstrate a computing system comprising a maximum of two registers 708, 908. It is advantageous for the number of registers in the computing system to be a low number, such as two, as these registers are associated with a large hardware area, when compared to the hardware area consumed by the memory. Thus, a low number of registers reduces the hardware size of the computing system. It is appreciated that alternative examples of the computing system may comprise less than two registers (e.g., FIGS. 7 and 8) or more than two registers. The number of local copy registers may be less than the number of stages in the pipeline. In particular the number of local copy registers may be one less than the number of stages in the pipeline, as this is sufficient to allow RAW hazards to be avoided in the pipeline without any need for stalling.

Figure 13:
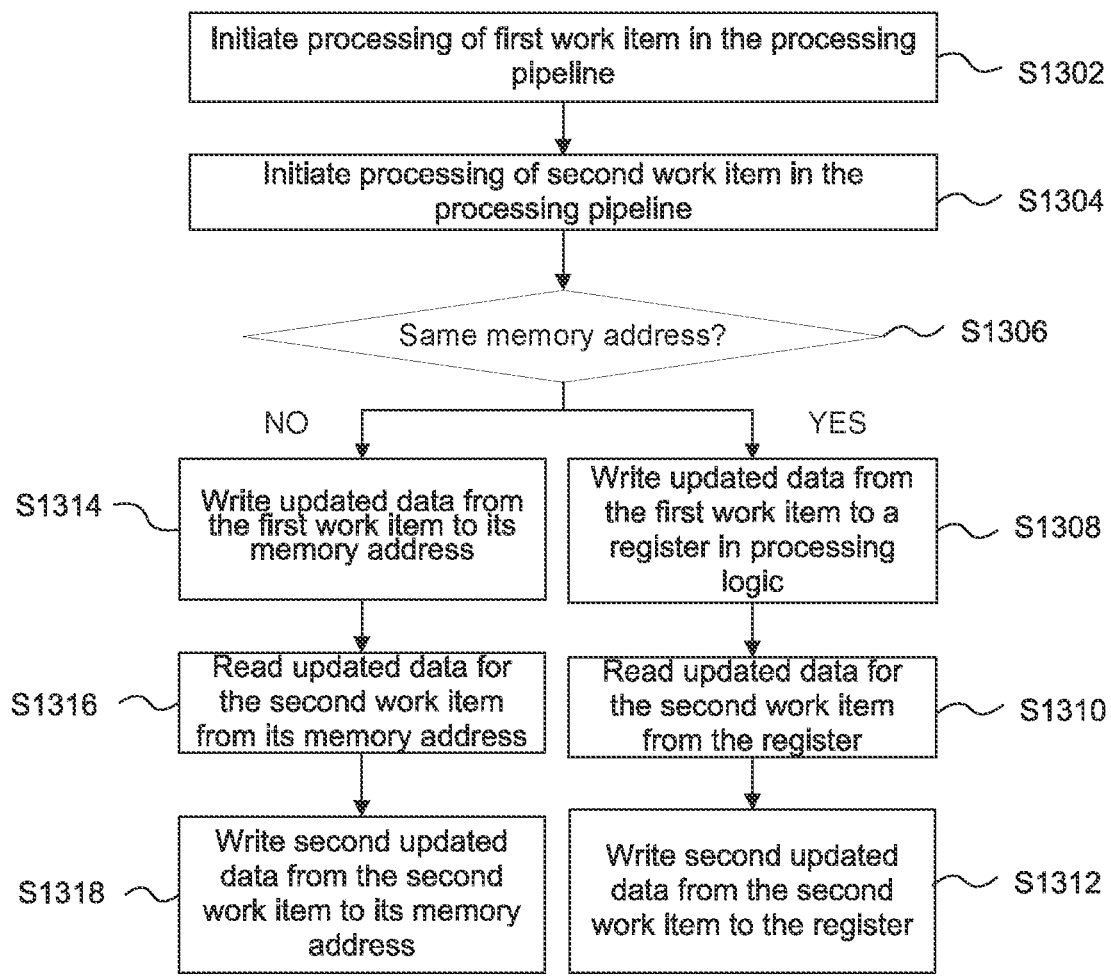
FIG. 13 is a flow chart for a method of processing a plurality of work items in processing logic of a computing system.

A flow chart for a method of processing a plurality of work items in processing logic of a computing system as illustrated in FIGS. 4-12 is illustrated in FIG. 13. The method of FIG. 13 is a simplified example in which there are just two work items being processed and there is just one register. The method is initiated at S1302, where the processing of a first work item is initiated in the processing pipeline. In other words, the first work item is provided to the processing pipeline at stage P0 and performs a read request at a memory address @A with which that work item is associated. The read request at memory address @A may occur either simultaneously to the initiation of processing of a second work item (see step 1304 below) or may occur before or after the initiation of processing of this second work item.

At step S1304, the processing of a second work item is initiated in the processing pipeline. In other words, the second work item is provided to the processing pipeline at stage P0. The processing of the second work item through the pipeline is initiated later than the processing of the first item through the pipeline. Furthermore, the processing of the second work item through the pipeline is initiated before the processing of the first item through the pipeline has completed. So, when the second work item is at stage P0 in the pipeline, the first work item may be at stage P1 or P2 in that pipeline. In other words, the processing of the first item through the pipeline is initiated earlier than the processing of the second work item through the pipeline.

At step S1306 it is determined whether the first and second work items are associated with the same memory address. As described above, if it is determined that the first and second work items are associated with different memory addresses, then both the first and second work items proceed with reading and writing data from the memory as normal. This is illustrated at steps S1314-S1318. At step S1314 the updated data from the first work item is written to the memory at an address with which the first work item is associated at stage P2 of the pipeline. At step S1316 the second work item reads updated data from the second memory address with which the second work item is associated at stage P1 of the pipeline. This step is performed in response to the performance of a read request by the second work item. In other words, the performance of the read request by the second work item is performed before step S1316, and after the initiation of the processing of the second work item at step S1304. The performance of the read request may occur at the same time as step S1314, or step 1306, or may be performed after either of these steps. The second work item then goes on to write its updated data to the second memory address at step S1318, when it reaches stage P2 of the pipeline.

If it is determined that the first and second work items are associated with the same memory address, then at step S1308 the first work item proceeds to write its updated data to a register in the processing logic instead of to the memory address with which the data is associated. Then, at S1310 the second work item reads updated data from the register instead of from the memory when it comes to perform its read operation.

The method illustrated in FIG. 13 further comprises step S1312 wherein the second work item writes its updated data to the register. Whilst there is data associated with a given address stored in the register, all work items that are subsequently propagated through the pipeline, and that are associated with that address, will read data from and write data to the register instead of from the memory. The method may comprise an additional step (not shown in FIG. 13) of writing the data from the register back to the memory, which may be performed when the register is to be used to store data associated with a different address.

It is mentioned above that the processing of work items (e.g., the second work item) through the computing system, comprising reading and writing data from addresses in the memory, may be executed over multiple clock cycles. By comparison, the processing of the second work item, including the reading of updated data from the register and the writing of second updated data to the register, is executed over a single clock cycle. In other words, the processing logic of the computing system is able to read and write to the registers without delay. An advantage of this is that it decreases processing latencies in the computing system.

A third work item may be processed by the computing system, following the first and second work items in the pipeline. The third work item may be associated with the same memory address as the first and second work items. The third work item is processed through the pipeline after data associated with the address of that work item (e.g., address @A) has been written to the register. The data associated with the address may be data that has been written to the register by the second work item. In this scenario, the processing logic is further configured to process the third work item by reading the second updated data from the register instead of reading data from the memory. Subsequently, the processing logic is configured to write third updated data to the register instead of writing data to the memory.

As with the writing of data from the second work item to the register, the writing of data from the third item to the register is performed on the basis of the processing logic determining that the data associated with address is already stored in the register, and therefore that there is no need to read that data again from the memory (and that the data in the memory is not as up-to-date as the data in the register). Thus, the processing of the third work item is initiated after it has been determined that the register has stored data associated with the same memory address as the third work item.

The advantage of the use of a computing system as illustrated in FIGS. 4-13 of the present application are that the occurrences of RAW hazards can be reduced or eliminated whilst maintaining a low system latency by avoiding stalling of the system during operation. This increases the overall efficiency of the computing system.

The registers 708, 908 of the computing system described herein have the same latency irrespective of whether or not they store data for a specific RAM address requested by an incoming work item. The function of the registers therefore differs from that of a general-purpose cache, which has a different latency depending on whether the requested address results in a cache hit or a cache miss. The registers 708, 908 are configured to only store data from work items associated with a RAW hazard, or to store data from subsequent work items if the registers are already storing data from work items associated with a RAW hazard. This also differs from the function of a general-purpose cache, which may store a copy of all of the data stored in the memory as opposed to a specific subset of that data.

The computing systems illustrated with respect to FIGS. 4-13 may form part of an image rendering system, such as a ray tracing system. A ray tracing system is an image rendering system that is configured to calculate the path of rays through a system. Where the computing system described herein is a ray tracing system, each work item that is to be processed by the system is an individual ray of the system. Rays may be grouped into tasks based on characteristics that are common to those rays. For example, rays may be grouped into tasks in dependence on their shader characteristics. Rays that are to be processed by using a particular shader may be processed within the same task, e.g. in parallel. Thus, where the work items described above are associated with specific addresses within the memory, each of those addresses may be associated with a shader that is used to process a group of rays within a task. The computing system described herein is particularly relevant for use in ray tracing technologies, because these technologies group rays together specifically with the aim of processing similar rays at similar times. The similar rays may be stored within the memory at similar locations. The grouping of rays together results in RAW hazards occurring frequently. Thus, the use of registers as described above is of particular relevance to ray tracing applications. Furthermore, the latency associated with stalling in order to avoid RAW hazards is also detrimental to image rendering operations. Thus, it is especially important that image rendering systems are able to minimise latencies where possible, using technologies such as those described herein.

An example of alternative application for the computing systems and methods described herein is in systems which receive work items from multiple sources which are received serially through a single interface. Such systems often require updates of previously stored values. An example of such a system comprises a distribution of autonomous sensor nodes in an Internet of Things (IoT) network, such as position sensor nodes. In this system, each sensor sends data packets (i.e., work items) of sensor data when it has sufficient battery charge. A wireless receiver can receive data packets from all sensors, can serialise these packets and can send the data to a RAM with an entry for every sensor. Each entry in the RAM stores a time-weighted average of the position, which is updated when a new data work item is received. Because sometimes a few sensors may be sending many work items while others may be sending none, this system would also benefit from utilising registers as demonstrated in FIGS. 4-13 to avoid RAW hazards.

A further exemplary application for the systems and methods described herein is for Digital Signal Processors (DSPs). Such processors are configured to store a stream of data packets (or work items) in a random access memory (RAM), where there is little predictability as to when certain addresses in RAM are addressed. An alternative use for these systems and methods is in any other processor application that makes use of Single Instruction Multiple Data (SIMD) processing to perform operations on packets of data in parallel, but where individual packets of data are presented in an unpredictable order. Examples of such processor applications can be found in video or image processing, where different operations must be run on different pixels depending on properties of the pixel. Exemplary properties of a pixel are colour, brightness, and rate of change. A previous part of the hardware determines these properties for each pixel individually and then determines what operation must be run on them, and if an operation must be run, the pixel is sent to a part of hardware similar to the task builder described above with respect to FIGS. 1 and 2.

Figure 14:
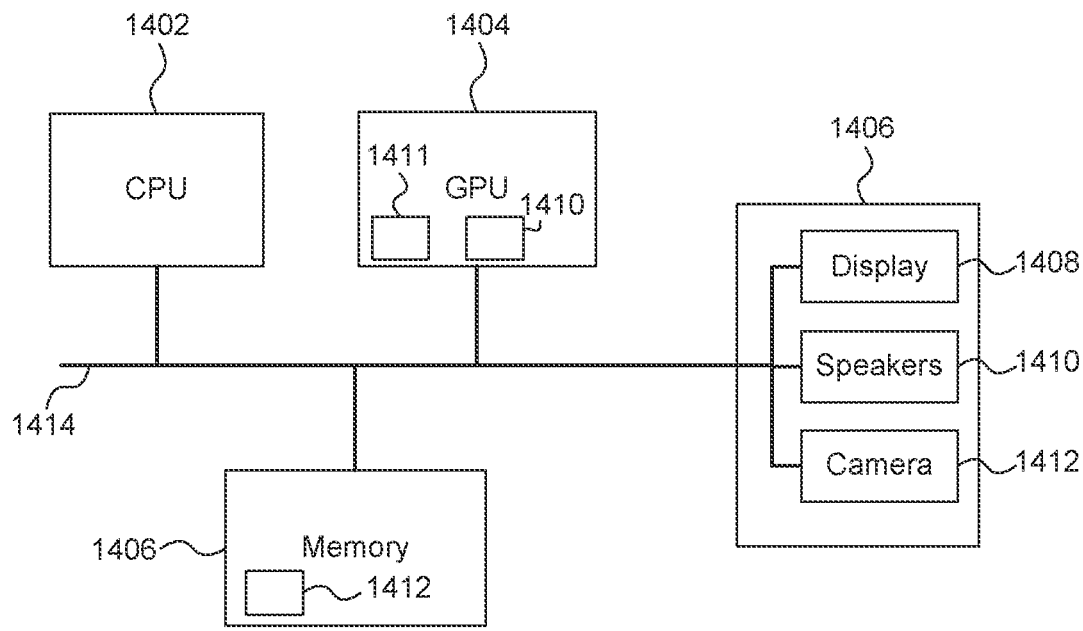
FIG. 14 shows a computer system which implements a computing system as described herein.

FIG. 14 shows a computer system which implements a computing system as described herein. The computer system comprises a CPU 1402, a GPU 1404, a memory 1406 and other devices 1415, such as a display 1416, speakers 1418 and a camera 1422. A processing block 1410 is implemented on the GPU 1404, as well as a Neural Network Accelerator (NNA) 1411. In other examples, the processing block 1410 may be implemented on the CPU 1402 or within the NNA 1411. The components of the computer system can communicate with each other via a communications bus 1420. A store 1412 is implemented as part of the memory 1406.

While FIG. 14 illustrates one implementation of a computer system, it will be understood that a similar block diagram could be drawn for an artificial intelligence accelerator system—for example, by replacing either the CPU 1402 or the GPU 1404 with a Neural Network Accelerator (NNA) 1411, or by adding the NNA as a separate unit. In such cases, again, the processing block 1410 can be implemented in the NNA.

The computing system of FIGS. 1-12 are shown as comprising a number of functional blocks. This is schematic only and is not intended to define a strict division between different logic elements of such entities. Each functional block may be provided in any suitable manner. It is to be understood that intermediate values described herein as being formed by a computing system need not be physically generated by the computing system at any point and may merely represent logical values which conveniently describe the processing performed by the computing system between its input and output.

The computing systems described herein may be embodied in hardware on an integrated circuit. The computing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a computing system configured to perform any of the methods described herein, or to manufacture a computing system comprising any apparatus described herein. An integrated circuit definition dataset may be, for example, an integrated circuit description.

Therefore, there may be provided a method of manufacturing, at an integrated circuit manufacturing system, a computing system as described herein. Furthermore, there may be provided an integrated circuit definition dataset that, when processed in an integrated circuit manufacturing system, causes the method of manufacturing a computing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS (RTM) and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a computing system will now be described with respect to FIG. 15.

Figure 15:
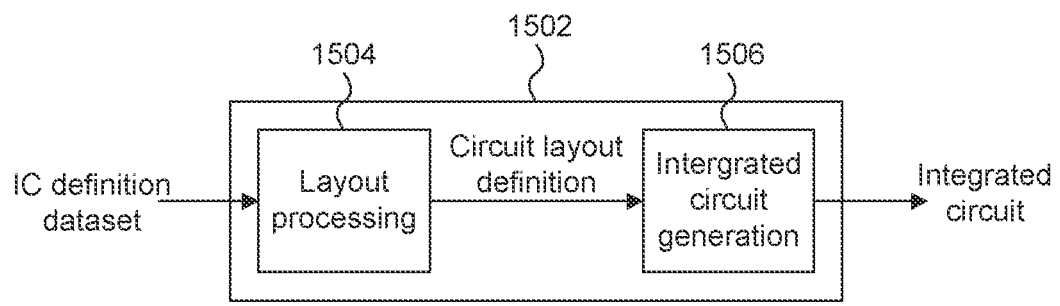
FIG. 15 shows an integrated circuit manufacturing system for generating an integrated circuit embodying a computing system.

FIG. 15 shows an example of an integrated circuit (IC) manufacturing system 1502 which is configured to manufacture a computing system as described in any of the examples herein. In particular, the IC manufacturing system 1502 comprises a layout processing system 1504 and an integrated circuit generation system 1506. The IC manufacturing system 1502 is configured to receive an IC definition dataset (e.g. defining a computing system as described in any of the examples herein), process the IC definition dataset, and generate an IC according to the IC definition dataset (e.g. which embodies a computing system as described in any of the examples herein). The processing of the IC definition dataset configures the IC manufacturing system 1502 to manufacture an integrated circuit embodying a computing system as described in any of the examples herein.

The layout processing system 1504 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1504 has determined the circuit layout it may output a circuit layout definition to the IC generation system 1506. A circuit layout definition may be, for example, a circuit layout description.

The IC generation system 1506 generates an IC according to the circuit layout definition, as is known in the art. For example, the IC generation system 1506 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1506 may be in the form of computer-readable code which the IC generation system 1506 can use to form a suitable mask for use in generating an IC.

The different processes performed by the IC manufacturing system 1502 may be implemented all in one location, e.g. by one party. Alternatively, the IC manufacturing system 1502 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a computing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 15 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 15, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of processing a plurality of work items in processing logic of a computing system, wherein the computing system comprises a memory, and wherein each of the work items is associated with a memory address in the memory, wherein the plurality of work items are processed through a processing pipeline comprising a plurality of stages in the processing logic, wherein at a given time different work items are at different stages of the pipeline, wherein the processing of a work item comprises: (i) reading data in accordance with the memory address associated with the work item, (ii) updating the read data, and (iii) writing the updated data in accordance with the memory address associated with the work item, the method comprising:
   processing a first work item and a second work item through the processing pipeline, wherein the processing of the first work item through the pipeline is initiated earlier than the processing of the second work item; and
   determining that the first and second work items are associated with the same memory address;
   wherein the processing of the first work item comprises writing first updated data to a register in the processing logic instead of writing updated data to the memory; and
   wherein the processing of the second work item comprises reading the first updated data from the register instead of reading data from the memory.

2. The method of claim 1, wherein the work items to be processed are rays that are used to perform ray tracing.

3. The method of claim 1, wherein the memory is a random-access memory (RAM).

4. The method of claim 1, wherein the processing pipeline comprises three stages, wherein each of the stages is executed over a respective clock cycle.

5. The method of claim 1, wherein the processing of the second work item further comprises writing second updated data to the register.

6. The method of claim 5, wherein the processing of the second work item, including the reading of the first updated data from the register and the writing of the second updated data to the register, is executed over a single clock cycle.

7. The method of claim 5, further comprising processing a third work item associated with the same memory address as the first and second work items, the processing of the third work item through the pipeline being initiated later than the processing of the second work item, wherein processing the third work item comprises reading the second updated data from the register instead of reading data from the memory and writing third updated data to the register instead of writing data to the memory.

8. The method of claim 7, wherein the processing of the third work item is initiated after it has been determined that the register has stored data associated with the same memory address as the third work item.

9. The method of claim 1, further comprising writing the data stored in the register to the memory.

10. The method of claim 9, wherein the data stored in the register is written to a line of the memory at the memory address with which the first and second work items are associated.

11. The method of claim 9, wherein the data stored in the register is written to the memory in response to determining that the processing of another work item, which is associated with a different memory address to the memory address with which the first and second work items are associated, is to write data to the register, further comprising overwriting the register with updated data from the processing of said another work item.

12. The method of claim 1, wherein the register is a first register, and the method further comprises:
   processing a first further work item and a second further work item through the processing pipeline, wherein the processing of the first further work item through the pipeline is initiated earlier than the processing of the second further work item; and
   determining that the first further work item and the second further work item are associated with the same memory address, that memory address being different from the memory address with which the first and second work items are associated;
   wherein the processing of the first further work item comprises writing first further updated data to a second register in the processing logic; and
   wherein the processing of the second further work item comprises reading the first further updated data from the second register instead of reading data from the memory.

13. The method of claim 1, further comprising storing indications of the memory addresses associated with the work items that are currently in the processing pipeline,
   wherein the determination that the first and second work items are associated with the same memory address is made by comparing the stored indications of the memory addresses.

14. A computing system comprising:
   a memory; and
   processing logic for processing a plurality of work items through a processing pipeline comprising a plurality of stages, wherein the processing of a work item comprises: (i) reading data in accordance with a memory address associated with the work item, (ii) updating the read data, and (iii) writing the updated data in accordance with the memory address associated with the work item, the processing logic being configured to:

process a first work item and a second work item through the processing pipeline, wherein the processing of the first work item through the pipeline is initiated earlier than the processing of the second work item; and determine that the first and second work items are associated with the same memory address;

wherein the processing of the first work item comprises writing first updated data to a register in the processing logic instead of writing updated data to the memory; and wherein the processing of the second work item comprises reading the first updated data from the register instead of reading data from the memory.

15. The computing system of claim 14, wherein the computing system is a ray tracing system.

16. The computing system of claim 14, wherein the register is the same width as a line of the memory.

17. The computing system of claim 14, wherein the register is a first register, and the processing logic further comprises a second register.

18. The computing system of claim 17, wherein the processing logic is further configured to:

process a first further work item and a second further work item through the processing pipeline, wherein the processing of the first further work item through the pipeline is initiated earlier than the processing of the second further work item; and determine that the first further work item and the second further work items are associated with the same memory address, that memory address being different from the memory address with which the first and second work items are associated;

wherein the processing of the first further work item comprises writing first further updated data to the second register in the processing logic; and wherein the processing of the second further work item comprises reading the first further updated data from the second register instead of reading data from the memory.

19. The computing system of claim 14, further comprising stage registers configured to store indications of the memory addresses associated with work items that are in the processing pipeline, wherein the processing logic is configured to determine that the first and second work items are associated with the same memory address by comparing the stored indications of the memory addresses in the stage registers.

20. A non-transitory computer readable storage medium having stored thereon an integrated circuit definition dataset that, when processed in an integrated circuit manufacturing system, configures the integrated circuit manufacturing system to manufacture a computing system comprising:

a memory; and processing logic for processing a plurality of work items through a processing pipeline comprising a plurality of stages, wherein the processing of a work item comprises: (i) reading data in accordance with a memory address associated with the work item, (ii) updating the read data, and (iii) writing the updated data in accordance with the memory address associated with the work item, the processing logic being configured to:

process a first work item and a second work item through the processing pipeline, wherein the processing of the first work item through the pipeline is initiated earlier than the processing of the second work item; and determine that the first and second work items are associated with the same memory address;

wherein the processing of the first work item comprises writing first updated data to a register in the processing logic instead of writing updated data to the memory; and wherein the processing of the second work item comprises reading the first updated data from the register instead of reading data from the memory.

* * * * *